PUMP

Original Filed April 14, 1964 8 Sheets-Sheet 1

PUMP

Original Filed April 14, 1964 8 Sheets-Sheet 2

INVENTOR.
MARVIN D. BENNETT
Christie, Parker & Hale
ATTORNEYS.

INVENTOR.
MARVIN D. BENNETT
BY Christie, Parker & Hale
ATTORNEYS.

PUMP

Original Filed April 14, 1964 8 Sheets-Sheet 4

INVENTOR.
MARVIN D. BENNETT
BY Christie, Parker & Hal
ATTORNEYS.

INVENTOR.
MARVIN D. BENNETT
BY Christie, Parker & Hale
ATTORNEYS.

INVENTOR.
MARVIN D. BENNETT
BY Christie, Parker & Hale
ATTORNEYS.

INVENTOR.
MARVIN D. BENNETT

BY

Christie Parker & Hale
ATTORNEYS.

INVENTOR.
MARVIN D. BENNETT

BY
Christie, Parker & Hale
ATTORNEYS.

United States Patent Office

Re. 26,820
Reissued Mar. 10, 1970

26,820
PUMP

Marvin D. Bennett, Long Beach, Calif., assignor to Royal Industries, Inc., Pasadena, Calif., a California corporation Original No. 3,279,382, dated Oct. 18, 1966, Ser. No. 359,628, Apr. 14, 1964. Application for reissue June 2, 1969, Ser. No. 847,475
Int. Cl. F04b *17/00, 7/00*
U.S. Cl. 103—49 37 Claims

Matter enclosed in heavy brackets [ ] appears in the original patent but forms no part of this reissue specification; matter printed in italics indicates the additions made by reissue.

*ABSTRACT OF THE DISCLOSURE*

*A fluid operated pump comprises a pair of piston-cylinder pumping units connected to a single valve for controlling the discharge of the materials and under the control of a fluid power control circuit. The pumping units are controlled to operate in alternate sequences of pumping and return strokes and to shift the control valve at a point in the pumping sequences when the pumping units are both momentarily at rest at the end of their alternate pumping and return strokes.*

This invention relates to pumps and, more particularly, to pumps adapted for conveying building materials such as plaster, concrete, mortar, and like moist, compressible materials.

Machines for pumping building materials such as plaster, concrete, mortar, and the like have been developed and have been in use over a long period of time. These building material pumps have been developed to transport these materials from one location to another as well as to allow the building materials to be applied by spraying. In the construction of a pumping unit for spraying the building materials, the important consideration is that the building material be delivered from the pump at a uniform spray rate to thereby allow the materials to be uniformly applied over a large area. These criteria, then, are different than when a machine is to be developed for the mere transportation of the building materials. One such machine adapted for applying building materials at a substantially uniform rate is disclosed in the divisional application of Marvin D. Bennett et al., Serial No. 242,578, filed November 30, 1962, now Patent 3,172,363, and assigned to the same assignee as the present application.

The use of any machine in a construction project is directed to the reduction of the building costs which can be attributed to labor costs. In a large construction project the economic feasibility of machines for handling such building materials is not only readily apparent but to a large extent necessary with present day construction techniques. Such machines include pumps for conveying these building materials from one location to another, conveyors, hoists, elevators, and machines for preparing the building materials such as concrete mixers, cement mixers, and the like. In the very large construction projects in which a long period of time is required from breaking ground to the completion of the project, it is economically feasible to set up this type of construction equipment on a permanent basis, equipment generally not readily portable, for the duration of the project. As a result, concrete pumps, for example, have been developed and have been used for a large number of years for conveying concrete and other building materials from one location on the project to another location. Such concrete pumps are represented in Patents Nos. 2,448,104 and 2,685,259.

When these prior art pumping units are utilized for handling concrete, they have the capability of pumping concrete on the order of 6–100 cubic yards per hour through a pipeline which may have a diameter on the order of six inches. These machines not only have to be permanently installed, but take a number of days to install and, once installed, require two to three operators. It will be readily appreciated that on a small building project, in the construction of commercial structures such as an office building or apartment, the project normally does not require such extensive construction equipment. Furthermore, on these smaller construction projects it has been common practice for the concrete to be delivered to the job in a ready-mixed concrete truck so that the concrete may be used or applied within a very short time of the arrival of the ready-mixed concrete truck. These smaller construction projects can be characterized from the amount of concrete required to be anywhere from 12–300 cubic yards of concrete per day. The ready-mixed truck, as is well known, consists of the adaptation of a motor vehicle or truck with a concrete mixer to allow the concrete to be substantially mixed while in transport. The provision of a pumping unit for conveying the concrete from such a ready-mixed concrete truck to the desired location on the construction project would, of course, eliminate the requirement of manually transporting the concrete from the concrete truck to the desired location on the project. In the past this conveyance has been in the form of manually wheeling the concrete by means of a wheel barrow to a particular location for use or onto a conveyor or hoist for application at an elevated location. Since the type of construction projects under consideration are of a limited time duration, it should be appreciated that the portability of any such pumping unit is an important feature since it allows the building contractor to use the unit on different construction projects and thereby maximize the productive time of the pumping unit. The production time, of course, involves the time required for setting up the machine from one project to another as well as the time required for cleaning out the machine. The time required for cleaning out a pump is an important consideration since in handling these moist, compressible building materials they do dry out and set in the machine, which may render the pump inoperable for the next project unless properly cleaned out.

Since these machines are specifically adapted for merely conveying the building materials from one location to another, the application of the building materials by means of the conduit is an important consideration not only from a portability standpoint but also from the operator's standpoint. The ease of handling such a conduit dictates that a light-weight conduit be employed and, as a result, the conduit is more susceptible to vibrations created by the pumping action. The pumping unit must deliver the building material or concrete at a rate so as to minimize vibrations created by the pumping action. This is a necessity not only from the operator's standpoint of handling the conduit but also from the standpoint of eliminating the movement of structural forms over which the conduit is laid. The light-weight conduits necessarily implies that the diameter is reduced and, therefore, the rocks employed in the concrete mix, for example, may have a tendency to pack within the conduit or hose itself. This packing may also result from the kinking of the conduit by the operator or wherein the conduit goes through two points of different elevations such as when the conduit is passed over a concrete form. In the prior art pumps, due to the power units that are employed for the large capacity pumps, such as exemplified in the aforementioned patents, if packing occurs it may cause the pumping action to stop or cause even the jamming or breaking of some of the working parts of the machine.

A consideration of the pumping action required for pumping the building materials under consideration from the standpoint of pumping concrete will reveal that the drive means for the pump must respond in a proper manner to the problems that develop in the pumping of various concrete mixes to allow the problem to be alleviated without any breakage of the pump parts and within a minimum time. As is well known, concrete comprises a paste of sand and cement along with stones. The stones may be graduated in size from one-quarter inch to one inch. The paste of sand and cement is employed in the correct proportions to fill the voids between the stones. In the pumping of mixtures of this type, it has been found that quite often the stone separates from the paste and the concentration of stone becomes immovable to cause packing in the pump. The stones will be concentrated to such an extent that they will bridge across an opening in the pump proper or bind in the discharge conduit to stop the flow of material. This packing will occur during the priming of the pump as well as during the pumping operation. One of the reasons for the separation of the stone and paste is due to the use of a mixture wherein the paste and stones are not in the proper proportions to form a fluid mix for pumping purposes.

The separation of the paste and concrete can also result from the action of the discharge valve of the pump. This separation occurs for example when the pumping of the concrete from a hopper to the discharge outlet is obstructed or due to the wearing of the discharge valve.

The present invention provides an improved, simple, portable positive displacement pump for conveying building materials such as plaster, concrete, mortar, and like moist, compressible materials that is readily adaptable for emall construction projects. In one particular embodiment of the invention the pump is adapted to be mounted on the chassis of a motor vehicle or truck and to be powered from the power unit of the truck. This construction not only results in a one-piece mobile unit for ease of movement from one location to another but also for travel on a highway. This integral construction eliminates the requirement for the provision of a separate power unit for the pump.

When the pumping unit of the present invention is employed for pumping concrete, it is capable of pumping concrete having a one-inch rock mix at a rate of 50 cubic yards per hour and which volume may be controlled by means of a volume control from 0–50 cubic yards per hour. In addition, the pump may be remotely controlled so that the operator can control the total volume of concrete delivered and the response of the pump is such that essentially a very small volume, a handful, will be delivered.

From a structural standpoint, the pump of the present invention comprises a pair of pumping units in combination with a single, wear resistant valve for controlling the discharge of the materials and under the control of a fluid power control circuit. The control of the pumping units is to cause them to operate in alternate sequences and to shift the single control valve at a point in the pumping sequences when the pumping units are both momentarily at rest and, therefore, no material is being moved through the control valve to thereby prevent the separation of the paste and stones and the material packing at the control valve. The pumping units may comprise piston-cylinder pumping assemblies that are controlled so that the control valve is shifted when one of the pistons is at the end of its pumping stroke and while the other piston is at the end of its return stroke. With the operation of the pumping units after the shift in the position of the control valve, the material being pumped is provided with an unobstructed, full flow path from the hopper to one of the pumping units and from the other pumping unit through the discharge outlet. This pumping action provides an almost steady flow of material and with a minimum of pulsations. The fluid power control circuit is adapted to maintain a safe pressure on the pump in the event "packing" occurs during the operation of the pump, thereby eliminating the danger of bursting the discharge conduit. To this same end, the pumping action can be reversed to relieve the pressure in the system when packing has occurred. The reversing action also allows the material in the discharge conduit to be emptied upon completion of a project.

The simplified construction of the pump allows ready access to the work pistons of the pump whereby the pumping unit may be cleaned in approximately ten minutes.

These and other features of the present invention may be more fully appreciated when considered in the light of the following specification and drawings, in which.

The pump of the present invention is particularly adapted for pumping moist, compressible materials such as the building materials, plaster, concrete, mortar, and the like. In order to simplify the description of the invention, the pump will be described in conjunction with the pumping of concrete.

Figure 1:
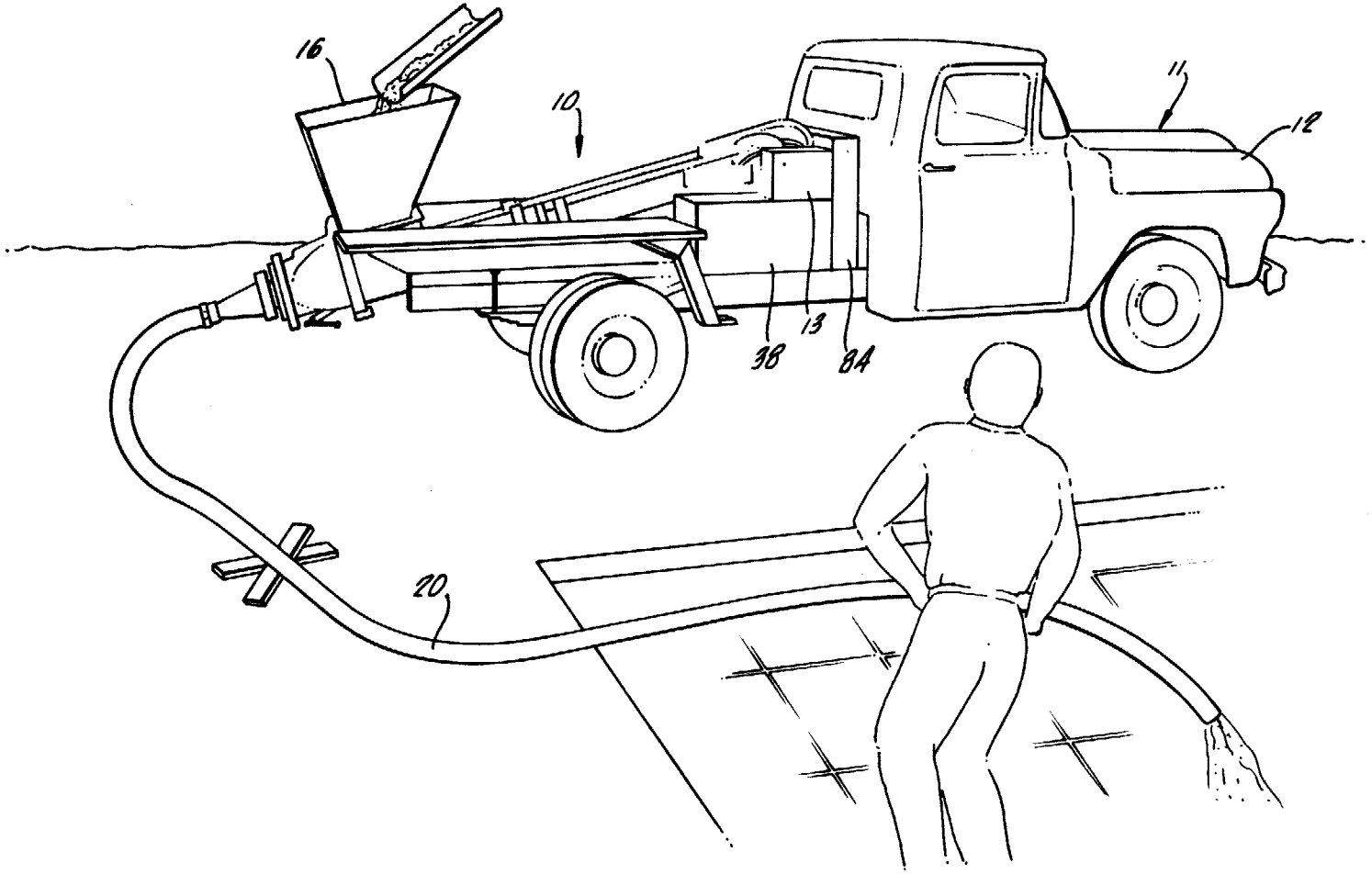
FIG. 1 is a perspective view of a concrete pump mounted on a motor vehicle embodying the invention and illustrated pumping concrete.
Figure 2:
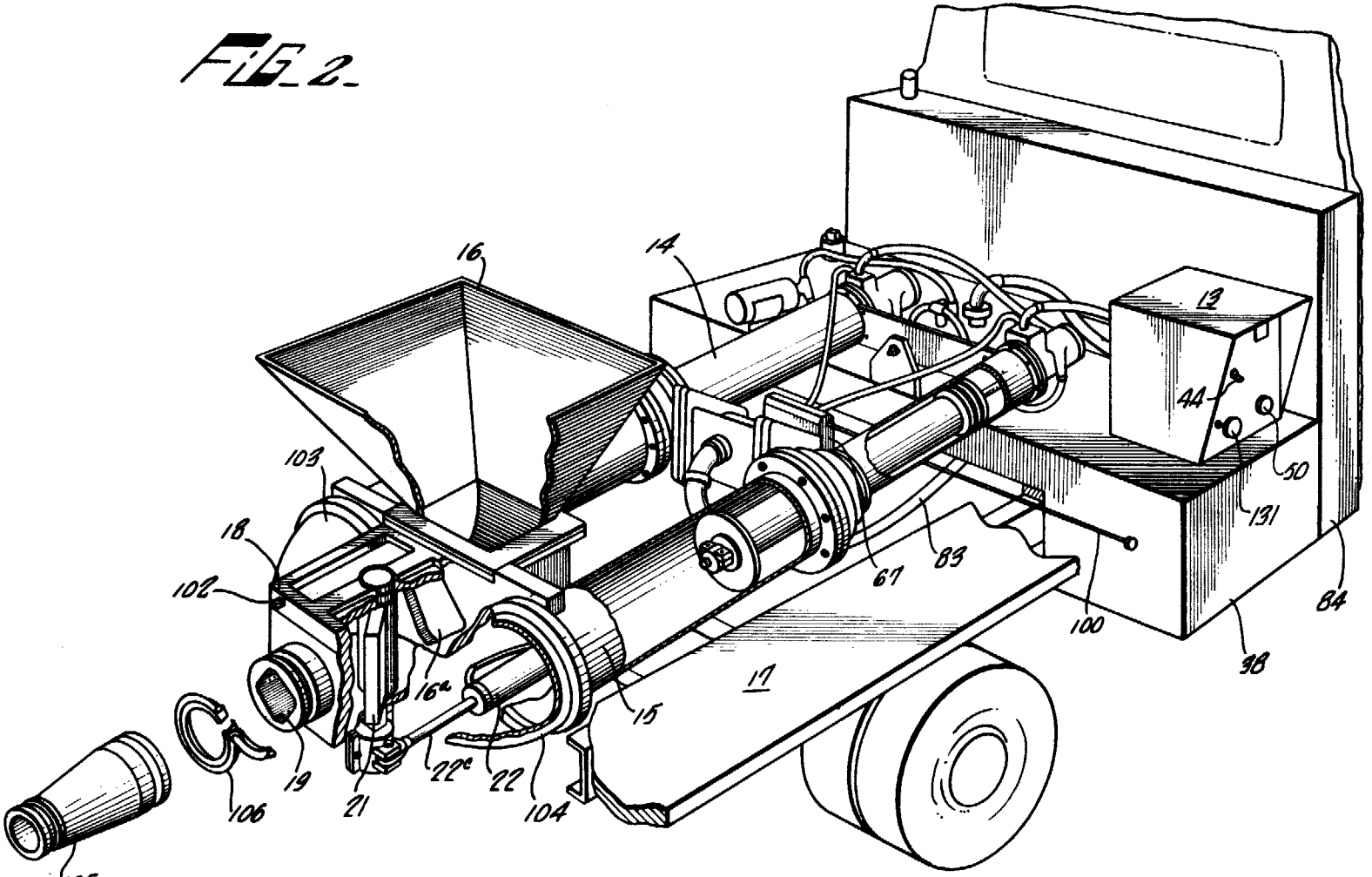
FIG. 2 is an exploded view, with parts broken away, of the concrete pump of FIG. 1.

The concrete pump 10 of the present invention is mounted to the rear of the cab of a motor vehicle or truck 11, see FIGS. 1 and 2. The motor vehicle 11 is provided with a conventional power unit located to the front of the cab of the motor vehicle and beneath the hood 12 in the conventional fashion. The power unit for the motor vehicle 11 is also employed as the primary power source for the concrete pump 10 and is therefore provided with a drive member (not shown) coupled between the power unit for the motor vehicle 11 and the concrete pump 10. It will, of course, be appreciated that the power unit for the motor vehicle may be any type of unit such as a conventional internal combusion engine which may be in the form of a diesel engine or a gasoline engine. The power unit may be any other type of convenient unit when the pump is not mounted on a motor vehicle, such as an electric motor, for example. The concrete pump 10 can be remotely controlled from an individual control panel 13 mounted on one side of the vehicle and behind the cab thereof.

The concrete pump generally comprises a pair of pumping units 14 and 15 mounted on opposite sides of a hopper 16. The hopper 16, as is conventional, is utilized to receive and store the material or concrete to be pumped and supplied thereto. The concrete may be supplied by a ready-mix concrete truck, a portion of the chute being illustrated in FIG. 1 in operative relationship with the hopper 16.

The motor vehicle 11 is also provided with a walk-way 17 arranged adjacent each of the pumping units 14 and 15 to allow the pump operator to control the discharge of the concrete into the hopper 16, for example.

The pumping units 14 and 15 are connected with a control valve unit 18 defining a common concrete chaber 21[a] for the pumps 14 and 15 and being arranged in communication therewith and with the hopper 16 to allow the pumping units to be directly charged with concrete to be pumped from the hopper 16 by means of the unobstructed flow path provided by the chamber and to be discharged in response to the pumping action through a common outlet 19 and then through a conduit 20 to the point of utilization of the concrete. The control valve unit 18 is provided with a single control valve 21 that is adapted to assume two positions and thereby subdivides the chamber 21[a] into two portions allowing the alternate charging and discharging of the concrete to occur substantially simultaneously in each portion.

The positions of the control valve 21 are effective for substantially closing off one of the pumping units from the hopper 16 while allowing this same pumping unit to discharge concrete through the outlet 19. During this same interval the other pumping unit is substantially closed off from the discharge outlet 19 while being in communication with the hopper 16 through the hopper port 16[a]. The charging of a pumping unit results due to the drawing in of the concrete from the hopper 16 due to the suction created by the pumping unit to be charged. As illustrated in FIG. 2, the control valve 21 is positioned by its fluid pressure motor 22, illustrated in the form of a hydraulically operated piston-cylinder unit, in a position to allow the pumping unit 14 to discharge concrete through the discharge outlet 19 while the pumping unit 15 is drawing concrete from the hopper 16. A conduit 20 is coupled to the discharge outlet 19 and may be a rigid pipe or a flexible conduit such as the three-inch rubber hose shown in FIG. 1.

The pumping units 14 and 15 may also be constructed in the form of fluid pressure pumping units and preferably are hydraulically operated piston-cylinder units whereby the units are charged during their return strokes. The pumping units 14 and 15 and the fluid pressure motor 22 are controlled by a fluid power control circuit, preferably a hydraulic circuit, adapted to control the alternate charging and discharging of the concrete into and out of the pumping units 14 and 15 while controlling the fluid motor 22 to position the control valve 21 during an interval both of the pumping units 14 and 15 are at rest to allow the concrete to be discharged through the discharge outlet 19 and a conduit 20 with a minimum of pulsations.

As will become more readily apparent hereinafter in conjunction with the description of the fluid power control circuit, the action of the control valve 21 with respect to extraordinarily large pieces of stone that may have been combined with the concrete mix or any foreign object that is conveyed into the common concrete chamber 21[a] will either be sheared off or cut off as a result of the action of the control valve 21 or, if the object is too hard to be cut off, the movement of the control valve will be stopped by the object without any damage to the pump 10, conduit 20, or operating and construction personnel.

Figure 3:
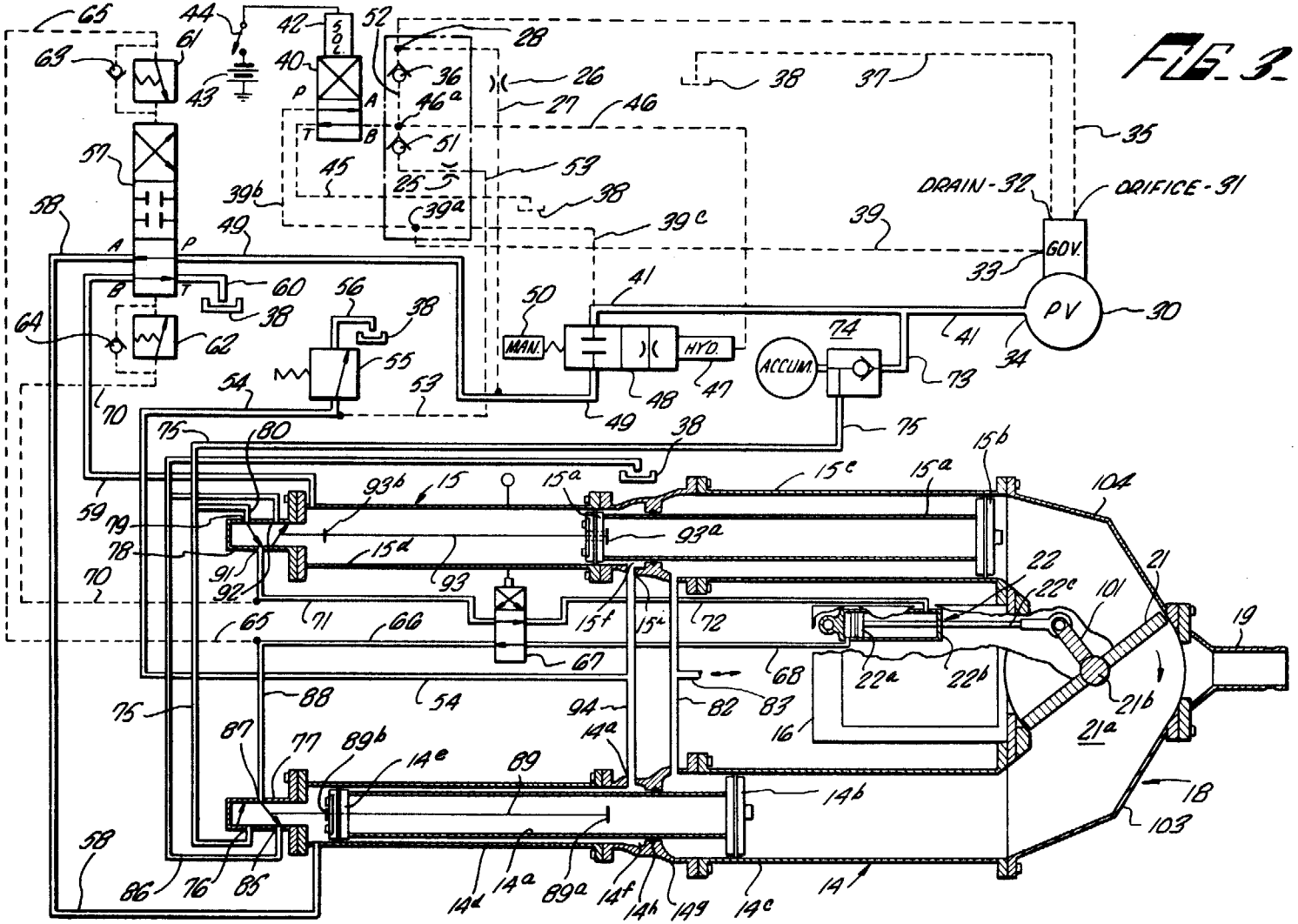
FIGS. 3–6 are schematic representations of the fluid control circuit for the concrete pump of FIGS. 1 and 2, showing portions of the pump in section, and with the circuit represented in its different phases of operation.

Now referring to FIG. 3 the fluid power control circuit will be described. The control circuit is a hydraulic circuit and is illustrated in FIG. 3 in its off or de-energized position. The fluid pressure for the control circuit is generated by a fluid pressure generator 30, schematically illustrated as a combination pump and volume governor. This pressure generator combination may be in the form of a commercially available variable volume pump in combination with a volume governor such as the Model MR pump and MGP governor manufactured by Racine Hydraulics & Machinery, Inc., Mobile Division, of Racine, Wis. The governor functions to maintain a constant flow regardless of pump pressure change or pump shaft speed change. The action of the pump unit functions to build up a pressure in the associated hydraulic control circuits up to 1,000 pounds and then stops pumping, maintaining the 1,000 pounds pressure throughout the system without puming any fluid, oil in this instance. The pressure may be maintained throughout the control circuit for an indefinite period of time since there is no heat being generated in the system.

The illustrated fluid pressure generator 30 includes an orifice sampling port 31, a drain port 32, and a sampling port 33 for the governor and a fluid or oil port 34 for the pump. The pump generates a pressure on the order of 60 pounds per square inch at the fluid port 34. The fluid port 34 for the pump maintains pressure on the associated pilot lines to maintain a balanced 60 pounds per square inch on the lines connected to the fluid line 41 at all times. The orifice sampling port 31 is connected by means of an orifice sampling conduit 35 to one end of a check valve 36. The drain port 32 of the governor is, in turn, connected directly to the fluid tank or oil tank 38 mounted on the motor vehicle 11 behind the cab of the vehicle 11. The drain port 32 is connected to the tank 38 by means of a conduit 37 and is diagrammatically represented as being connected to a sump. The sampling port 33 is in turn connected by means of a sampling line 39 to the junction 39[a] and which junction is directly connected to one of the ports of a pilot valve 40 and the other junction is connected to a fluid line 41 having its other end directly connected to the fluid port 34 of the pump of the generator 30.

The pilot valve 40 is a solenoid operated valve and is operated by means of the solenoid 42, which is connected to a direct current source of potential shown as the vehicle battery 43 provided with an on-off switch 44. The on-off switch 44 is located on the pump control panel 13 of the motor vehicle 11. The pilot valve 40 is a reversible valve and is shown in its off position with its pressure port P directly connected by means of the conduit 39[b] to the junction 39[a] and in communication with the A port. The port A of pilot valve 40 is always blocked. The T port, or the tank port, is directly connected to the tank 38 by means of the conduit 45. The conduit 45 is, therefore, connected through the port T and the port B of the pilot valve 40 in communication therewith and by means of the pilot conduit 46 to a hydraulic motor 47 provided for operating a volume control valve 48. The volume control valve 48 is shown in its off position whereby the oil in the line 41 is not conveyed through the valve 48 to its exit port and the oil line 49 connected thereto. The volume control valve 48 is further provided with a manual volume control knob 50 for controlling the volume of the fluid passing through the valve 48 when it has been operated to its open position by the hydraulic motor 47. Operation of the hydraulic motor 47 opens the volume control valve 48 to a preselected position and when open may then be varied by means of the volume control knob 50, which is also located on the pump control panel 13.

The check valve 36 is connected in serial fashion relationship with another check valve 51 by means of the conduit 52 and the junction 46[a] for the conduit 46. The opposite side of the check valve 51 is provided with a conduit 53 which is directly connected to a relief fluid line 54 connected to the entry port of a relief valve 55. The check valve 36 is arranged to be in an open position only when the pressure in the orifice sampling line 35 is greater than the pressure in the conduit 52, such as when the control circuit is in the illustrated off position. In the same fashion, the check valve 51 is illustrated in FIG. 3 closed and is opened in response to the greater pressure being applied at the junction 46[a] side of the valve. The relief valve 55, as illustrated, is normally in a closed position to the flow of fluid and has its exit port connected by means of a conduit 56 to the tank 38.

The fluid conduit 49 is connected to the exit port of the volume control valve 48 and has its opposite end connected to the pressure port P of a four-way reversing valve 57. The reversing valve 57 is normally arranged with the ports P and A in communication. The port A is connected to a fluid line 58 which has its opposite end directly coupled to the pumping unit 14 for pressurizing the unit. Similarly, fluid conduit 59 is connected to the B port of reversing valve 57 for pressurizing the pumping unit 15. The port B of the four-way reversing valve 57 in its normal position is in direct communication with the T port or the tank port of this valve. The T port, in turn, is connected by means of a conduit 60 draining into the tank 38. The four-way reversing valve 57 is operated by a pair of sequencing valves 61 and 62 for sensing the pressure in the cylinder 22[b] on the opposite sides of the piston 22[a] of the fluid motor 22. The sequencing valves 61 and 62 are provided with individual check valves 63 and 64 respectively to allow the free flow of oil from the reversing valve 57. The check valve 63 is connected between the inlet of the sequencing valve 61 and to receive and pass oil from the reversing valve 57. The check valve 64 is connected between the inlet of the sequencing valve 62 and to receive and pass oil from the opposite end of the reversing valve 57 from the check valve 63. The check valve 63 opens to pass the oil from the reversing valve 57 when it is operated by the sequencing valve 62 and the check valve 64 opens in response to the operation of the valve 57 by the sequencing valve 61.

The fluid port 34 of the pressure generator 30 is also connected by means of a T connection for the fluid line 41 to a conduit 73 having its opposite end connected to a port for an accumulator 74. The accumulator 74 is provided with a check valve to prevent the back flow of oil from the accumulator proper which is charged at 200 pounds per square inch. When the system pressure exceeds the 200 pound pressure, the associated check valve opens up, admitting oil into the accumulator proper. The remaining port of the accumulator 74 is connected by a fluid line 75 to a port 76 for a pilot valve 77 mounted integral with the pumping unit 14. This same fluid conduit 75 is connected to a corresponding integral pilot valve 78 for the pumping unit 15. The port 79 for the pilot valve 78 is connected to a conduit 80 and a T connection to the fluid conduit 75.

The pumping units 14 and 15 may be of any convenient construction and the preferred construction in accordance with the present invention is to provide reciprocating piston-cylinder assemblies whereby the forward or power stroke of the pistons is utilized for pumping the charged concrete through the concrete chamber 21[a] and the discharge outlet 19 and the return stroke is utilized to charge concrete into the cylinder units from the hopper 16 through the concrete chamber 21[a]. The construction of the pumping units 14 and 15 is essentially identical and only one of the units need be examined. The pumping unit 14 is illustrated in FIG. 3 with its piston 14[a] at its left hand extremity or at the end of its reverse stroke. The hollow piston 14[a] is provided with a piston head 14[b] mounted for sliding movement within the cylinder section 14[c]. The cylinder section 14[c] of the pumping unit 14 is one of the three cylinder sections for the pumping unit 14. Another cylinder section is identified as the section 14[d] and is mounted in a coaxial relationship with the third cylinder section 14[g]. The cylinder section 14[g] is mounted between and coaxial with the sections 14c and 14[d]. The cylinder section 14[d] slidably receives the rear portion of the piston 14[a] mounting the head 14[e].

The cylinder portion 14[c] and the corresponding cylinder portion 15[c] for the pumping unit 15 are each provided with means for cooling the pistons 14[a] and 15[a] respectively. As specifically shown, these pistons are adapted to be supplied with a heat exchange fluid for jacketing each of the pistons 14[a] and 15[a]. The heat exchange fluid may be water supplied by a water conduit 82 connected between suitable ports for the cylinder sections 14[c] and 15[c] and a water line 83 connected to a water tank 84 carried by the motor vehicle 11 directly behind the cab of the vehicle and adjacent the oil tank 38, see FIGS. 1 and 2.

The provision of the means for the cooling of the pistons 14[a] and 15[a] is an important, practical aspect of the present invention since it not only functions to cool these pistons on every piston stroke, but also serves as a lubricating medium for the back sides of the pistons to extend the life of the pistons. The movement of the piston 14[a] into the hydraulic fluid carrying piston sections 14[d] and 14[g] also produces a heat exchanging action with the hydraulic fluid of the system. It will also be recognized that the heat that is generated by the operation of the pumping units 14 and 15 can cause the concrete that is charged or drawn into the cylinder sections 14[c] and 15[c] from the hopper 16 to heat up and set. The setting of any substantial amount of concrete in the cylinder sections 14[c] and 15[c] would, of course, render the pump 10 inoperative. With the water occupying the volume between the piston 14[a] and the cylinder section 14[c], for example, it prevents air from being drawn into the piston units. It should also be noted that, as illustrated in FIG. 3, the water has been substantially removed from the cylinder section 14[c] since the associated piston 14[a] is at the end of its return stroke. In traveling to this end position, the piston head 14[b] pressurizes the water in the section 14[c] forcing it through the conduit 82 and into either the water tank 84 or into the cylinder unit 15[c] for the pumping unit 15 or both. In the same fashion, when the piston 15[a] begin its return stroke, the water is fed back from the cylinder section 15[c] to the cylinder section 14[c]. The water supply in these cylinder sections is maintained at a preselected level as a result of the conduit 82 being connected to the water tank 84.

Another important aspect of the present invention is the construction of the pumping units 14 and 15 and, more particularly, the construction of the piston-cylinder units integral with their individual pilot valves 77 and 78. This construction simplifies the over-all hydraulic control circuit. The pilot valve 77 is removably mounted to the rear end of the cylinder portion 14[d], as illustrated in FIG. 3. The pilot valve 77 is a two-position valve and is provided with three ports. The port 76, as mentioned hereinabove, is connected by means of the conduit 75 to the accumulator 74. The pilot valve 77 is provided with a port 85 defined adjacent the port 76 and shown connected to the tank 38 by means of the fluid conduit 86. The third port is identified as the port 87 and is connected by means of a fluid conduit 88 to the conduit 66. The pilot valve 77 has the port 76 closed, while the ports 85 and 87 are internally connected thereby coupling the conduits 86 and 88. This position of the pilot valve 77 corresponds to the left-hand position of the piston 14[a], as shown. The pilot valve 77 is operated by means of a pilot rod 89 slidably mounted to the piston head 14[e] and to be moved thereby. The pilot rod 89 is provided with a stop 89[a] adjacent its forward end and a similar stop 89[b] adjacent its rear end. The coaction of the pilot rod 89 and piston 14[a] is such that the piston slides along the rod 89 until the piston head 14[e] engages the stop 89[a] or 89[b], at which time the piston head 14[e] carries the pilot rod 89 along with it to change the position of the pilot valve 77. The other positions of the pilot valves 77 and 78 can now be appreciated by examining the valve 78, since the piston 15[a] is shown at the end of its pumping stroke. At this time the port 79 and the port 91 for the pilot valve 78 are interconnected, while the remaining port 92 is maintained in a closed position. These ports correspond to the ports 76 and 87 for the pilot valve 77 and are in communication when the valve 77 assumes its other position.

Piston head 14[e] is maintained in a sealed, sliding relationship with the inner wall of the cylinder portion 14[d] to prevent the fluid or oil to pass therebetween. A chamber 14[f] is defined between the piston head 14[e] and a sealing element 14[h] sealing the chamber 14[f] from the open end of the cylinder section 14[g], the end opening into the cylinder section 14[c]. The cylinder section 14[g] is provided with a port 14[i] communicating with the chamber 14[f] and illustrated with a fluid line 94 connected to the corresponding port for the pumping unit 15. This port is illustrated as the port 15[i] communicating with the chamber 15[f] whereby the fluid in the cylinder section 14[d], for example, may be transmitted through the chamber 14[f] and the conduit 94 into the chamber 15[f] for the pumping unit 15. The conduit 94 is also connected to the fluid conduit 54 having its opposite end directly connected to the relief valve 55. It should be appreciated that the feeding of the fluid from one cylinder unit to the other cylinder unit in this fashion is effective to drive the corresponding piston into its return stroke in response to the driving of the other piston into its pumping stroke. The fluid is continuously supplied to the chambers 14[f] and 15[f] through the fluid path provided from the fluid generator port 34, fluid line 41, pilot lines 39[c] and 39[b], the communicating ports P and B of the pilot valve 40, through the open check valve 51, pilot line 53 including orifice 25, line 54 and line 94. The fluid line 54 is connected to the relief valve 55 to pass oil in the reverse direction when the pressure generated opens the relief valve.

The reversing valve 67 is provided to reverse the action of the fluid control motor 22 and thereby reverse the action of the control valve 21. The operation of the reversing valve 67 is such that in the normal or discharging position the concrete is discharged through the outlet 19 and the conduit 20 while, when it is operated to the reversing position, it causes the concrete to be drawn back through the conduit 20 and the outlet 19 and back into the hopper 16. The importance of this reversing action can best be appreciated when it is considered that in pumping concrete any appreciable distance and, in particular, when the conduit is to pump concrete to an elevated location that with the completion of the work the conduit may be fully loaded with concrete. A fully loaded conduit is not only difficult to handle but increases the difficulty and time for dismantling and cleaning the pump in preparation for its reuse. With the provision of the reversing valve 67, the concrete can be simply drawn out of the conduit 20 and the concrete chamber 21[a] into the hopper 16 to facilitate cleaning the pump.

The reversing valve 67 is a manually controlled valve and is controlled through the push rod 100 which is accessible to the pump operator adjacent the control panel 13, as best seen in FIG. 2. In its normal position, of course, the valve 67 is arranged to pump concrete through the outlet 19 and for this operation a pair of ports are directly connected to the fluid lines 66 and 68 with the line 68 being also connected to the left-hand end of the cylinder 22[b]. In the same fashion, the other pair of ports of the reversing valve 67 are connected between the fluid lines 71 and 72, with the latter line being connected to the right-hand end of the cylinder 22[b]. The reversing action results when the push rod 100 is operated to move the valve sleeve to place the reversing ports in position for interconnecting the fluid line 71 with the line 68 while the fluid line 66 is interconnected with the fluid line 72. It should now be appreciated that this merely pressurizes and exhausts the opposite sides of the piston 22[a] from the normal pumping position of the valve and thereby reverses the position of the control valve 21.

The fluid pressure motor 22, which operates the control valve 20, as mentioned hereinabove, is a piston-cylinder unit in which the piston 22*a* reciprocates within the cylinder 22*b* in response to pressure being applied to the opposite sides of the piston 22[a]. The fluid pressure motor 22 is secured to the frame of the concrete pump 10 and has its piston rod 22[c] pivotally connected for operating the control member 21 by means of a pivot arm 101 connected to the free end of the rod 22[c] and the central pivotable shaft 21[b] of the valve 21. The rod 22[c] is located under the concrete chamber 21[a]. The control element 21, which is commonly referred to as a flapper valve, is pivotally mounted to the control valve unit 18 by having its shaft 21[b] journaled at its ends at the opposite faces of the control valve unit 18, as best seen in FIG. 2. The control valve 21 is defined to be swingable within the common concrete chamber 21[a] to alternately substantially close off the discharge outlet 19 from one of the pumping units 14 and 15 while substantially closing off the discharge outlet 16[a] of the hopper 16 from the other pumping unit. Stated differently, during the work or pressure stroke of one of the pumping units the concrete is discharged through the discharge outlet 19 due to the position of the control or flapper element 21 while at this same time the suction created by the return stroke of the other pumping unts is effective to draw the concrete from the hopper 16 and into the work portion of said other pumping unit.

The position of the control valve 21, as illustrated in FIG. 3, is the position it assumes when the right-hand end of the fluid motor 22 is pressurized through the conduit 72 during the normal position of the reversing valve 67. It will now be appreciated that in this position the discharge outlet 19 is substantially closed off from the pumping unit 15 and, in particular, the cylinder section 15[c] while allowing communication, in fact defining an unobstructed, free flow path, between the cylinder section 15[c] and the hopper 16 through the hopper outlet port 16[a]. At this same interval the hopper outlet port 16[a] is substantially closed to the cylinder unit 14[c] while forming a direct free flow path for the concrete to be discharged through the concrete chamber 21[a] and the outlet 19. Upon the operation of the fluid pressure motor 22, the opposite side or the left-hand end of the piston 22[a] is pressurized to cause the control valve element 21 to rotate in a clockwise direction to thereby close off the hopper discharge outlet 16[a] from the pumping unit 15 while providing a direct concrete path between the cylinder section 15[c] and the discharge outlet 19. This action occurs since the piston 22[a] has traveled to the opposite end or the right-hand end of the cylinder 22[b] thereby extending the piston rod 22[c] further towards the discharge outlet 19 to cause the control element 21 to rotate or flip in the clockwise direction about its shaft 21[b], as can be better appreciated from examining FIG. 6. Of course, at this same time the cylinder section 14[c] may be charged from the hopper 16 since the hopper outlet port 16[a] is in direct communication therewith. This is the normal pivotal action of the control element 21 for discharging concrete and it should be appreciated that with the actuation of the reversing valve 67 the action is essentially the same except that with the pressurizing of the piston 22[a] in the opposite directions the pumping units 14 and 15 are adapted to draw the concrete from the conduit 20 through the discharge outlet 19 and into the cylinder sections 14[c] and 15[c] during the return stroke of the corresponding piston. During the interval that the concrete is being drawn in from the discharge conduit 20, any concrete in the common chamber 21[a] that is subjected to the pressure stroke of the other pumping unit will be forced into the hopper 16 through the hopper port 16[a].

The construction of the control element 21, as best seen from an examination of FIG. 2, is defined as solid metallic element that is wear resistant to the abrasive materials being pumped and of sufficient structural rigidity so that, if a stone or foreign object is conveyed into the chamber 21[a] and between an end of the control element 21 and an adjacent side wall defining the concrete chamber 21[a], the stone will be sheared off to allow the control element to continue its travel or, if the stone or foreign object is of a size whereby the power imparted to the control element 21 is not sufficient to shear off this object, the control element will be arrested against the object without stopping the pump 10. The stoppage of the control element 21 under these conditions is an important advantage since it prevents the destruction or breakage of the pump elements that may occur when a mechanical drive system is resorted to.

Figure 7:
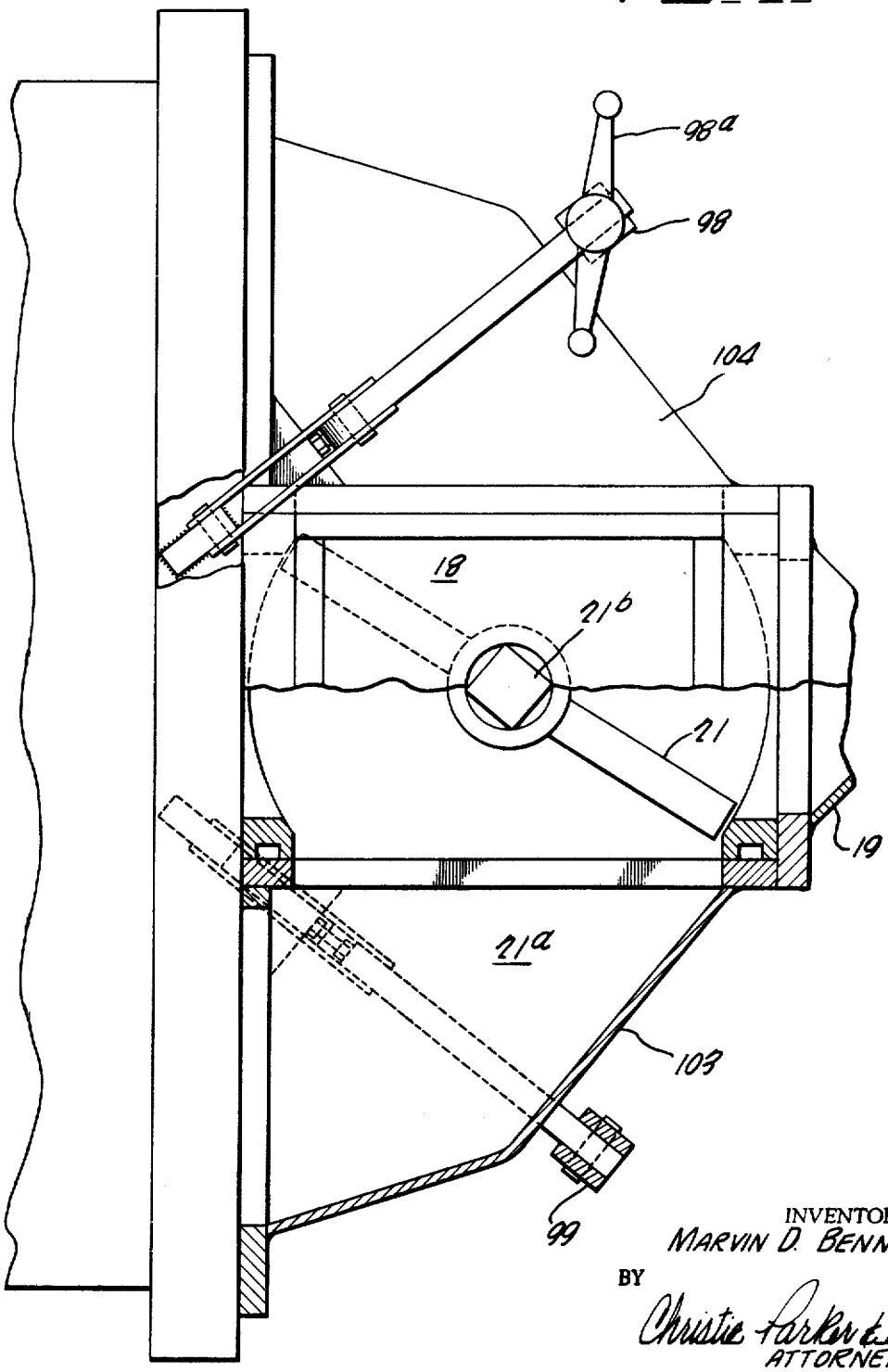
FIG. 7 is a partial top view, with portions broken away, of the control unit end of the pump.

To provide this stone cutting action the outer face of the member defining the discharge outlet 16[a] is provided with a radius having a centerline coincident with the centerline of control valve shaft 21[b] whereby the outer end of the control valve 21 sweeps by this face, as best seen in FIG. 7. In the same fashion, the coacting surface for the opposite end of the control element 21 or the inner face of the discharge outlet 19 is defined with a radius. The hopper discharge outlet 16[a] and the cross-section of the discharge outlet 19 are defined of a shape to cause any large stones or foreign objects to be guided and positioned along the aforementioned arcuate surfaces to cause only a single stone to be positioned between an end of the control element 21 and one of the discharge outlets. To this end, examining the hopper discharge outlet 16[a], it will be seen that the opening is based on a square with a pair of corners cut off, the top and bottom corners, and with the remaining pair cut off and provided with a radius, see FIG. 2. It should be appreciated that a stone wedged between an end of the control element 21 and the discharge outlet 16[a] will be pushed along the edge thereof to the top of the opening and then cut off by the continued swinging action of the valve 21. Of course, the valve 21 will be stopped if the stone is too large to be cut.

The control valve unit 18 is further defined as a unitary structure whereby if the single control valve 21 is damaged or rendered inoperative, the entire control valve unit may be readily replaced by another unit through the removal of the four bolts, similar to the bolt 102 securing the unit to the pump frame, as best seen in FIG. 2.

Another important feature of the present invention from the standpoint of cleaning the pump 10 is that the cylinder sections 14[c] and 15[c] are connected with individual elbow members 103 and 104 removably connected between these cylinder sections and the structure of the control valve unit 18 defining the concrete chamber 21[a]; as best seen in FIG. 7. The elbows 103 and 104 are slipped into position between the control unit 18 and their respective pumping units 14 and 15 and are maintained in this position solely due to the pressure provided by locking the respective clamping members 98 and 99. The clamping members 98 and 99 each have one end pivotally connected to the pump frame and are placed in a locking position by means of a clamp handle such as the handle 98[a] illustrated for the clamping member 98. It should be appreciated that opening the handle 98[a] unclamps the elbow member 104 allowing it to drop to the ground, thereby rendering the pumping unit 15 and the concrete chamber 21[a] accessible to an operator. With the removal of one elbow member 103 or 104, it should be appreciated that access to the associated pumping piston is afforded as well as access to the control valve element 21 and the remaining portions of the concrete chamber 21[a]. This can be best appreciated from the broken away section of the elbow 104 illustrated in FIG. 2. With access to the interior of the work portion of the cylinder units and the common concrete chamber 21[a], any necessary repairs may be readily accomplished or any concrete that may have dried within this area can be readily scraped out and the entire pumping unit cleaned.

The discharge outlet 19 is adapted to accept a discharge nozzle 105 that is clamped to the outer end of the discharge outlet 19 by means of the self-locking, clamping member 106, the clamping member 106 being of substantially circular configuration while the other end of the discharge outlet 19 as well as the enlarged end of the discharge nozzle 105 are defined with a groove around the outer periphery for snapping these two elements together and accepting and securing the clamp 106 therein, the nozzle 105 being locked to the discharge outlet 19 when the clamping element 106 is locked thereto. In the same fashion, the discharge conduit may be locked to the discharge end of th enozzle 105 by being clamped to the discharge end thereof, as best seen in FIG. 1. The discharge conduit 20 is preferably in the form of a lightweight conduit to allow it to be readily handled by an operator and of sufficient structural rigidity consistent with the abrasive nature of the concrete or building material being pumped. The pump of the present invention has been successfully operated for pumping concrete employing a three-inch rubber hose. It should also be understood that a rigid conduit or iron pipe may be employed as well as a flexible conduit. The concrete pump 10 is capable of pumping a concrete mixture having one-inch rock therein. It will also be appreciated, in view of the above description, that the conduit 20 may be readily disconnected from the nozzle 105 since, with the machine at rest and the hydraulic control circuit turned off, there is no pressure on the system and, therefore, the hose 20 can be readily disconnected.

Figure 8:
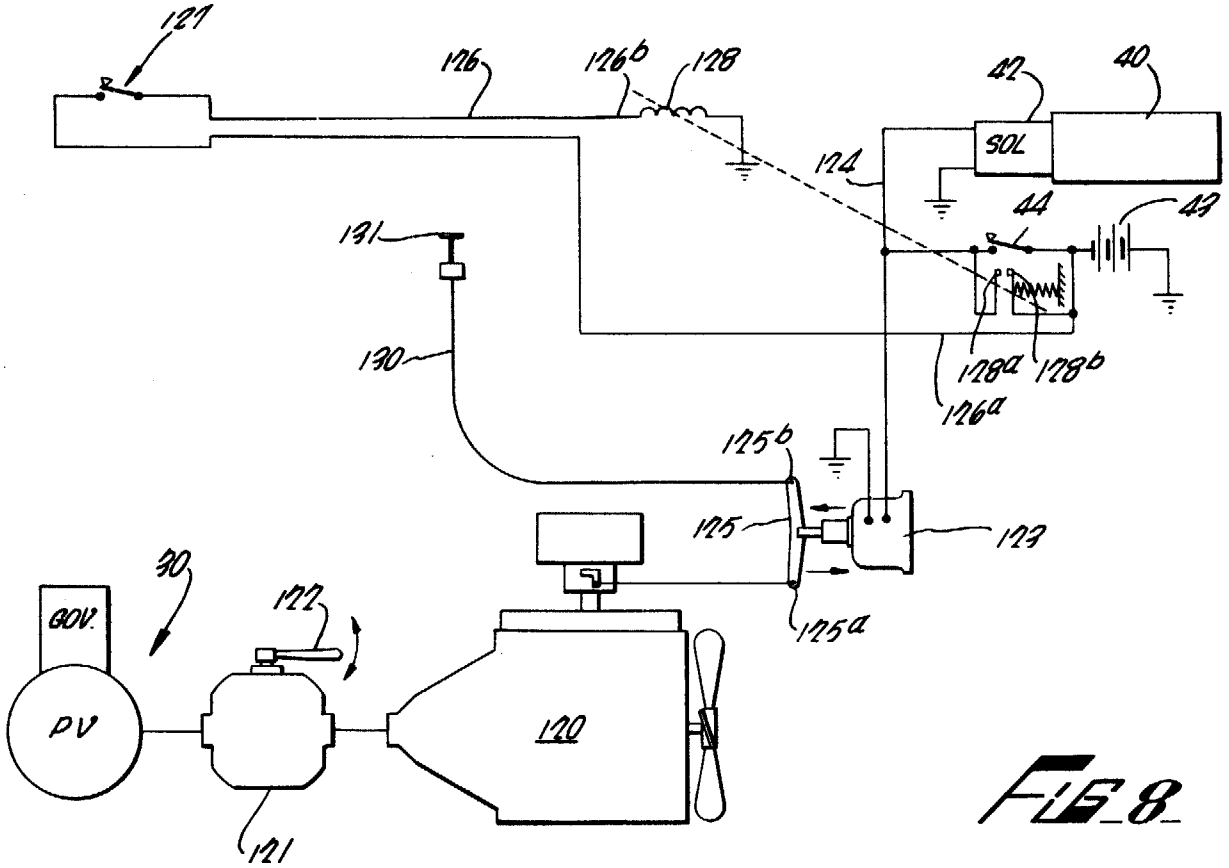
FIG. 8 is a diagrammatic representation of the power assembly for the fluid pressure generator of the pump including a schematic representation of the electrical controls for the pump.

Now referring to FIG. 8, the means for coupling a power unit to the fluid pressure generator 30 and the control means therefor will now be described. The power unit, as mentioned hereinabove, may be any convenient power unit and is illustrated in FIG. 8 as comprising the internal combustion engine of the motor vehicle or truck 11. The power unit is identified by the reference numeral 120 and is a conventional gasoline operated internal combustion engine illustrated with its carburetor mounted thereon. The conventional drive shaft for the power unit 120 is coupled to a power take-off unit 121 which has its opposite end coupled to drive the fluid pressure generator 30 and, more particularly, the pump unit therefor. The power take-off unit 121 is a commercially available unit and is mounted in accordance with the present invention in the cab of the motor vehicle adjacent the driver's seat to be accessible to the operator. The power take-off unit 121 is switchable by means of the switching arm 122 to couple the power unit 120 directly to the motor vehicle for powering it and to decouple the pressure generator 30. Also, upon rotation of the handle 122, the power unit 120 is decoupled for driving from the motor vehicle 11 and coupled directly to the pump 10 of the fluid pressure generator 30 for driving same. It will be understood that the coupling means or shaft between the power unit 120 and the power take-off unit 121 and also between the unit 121 and the pump of the fluid pressure generator 30 are all of conventional construction.

As mentioned hereinabove, the pilot valve 40 is controlled by a solenoid 42 which is energized from the motor vehicle battery 43. The solenoid 42 is energized and de-energized by means of a manually operated start-stop switch 44 located on the control panel 13. In addition to the solenoid 42, there is provided a control solenoid 123 connected through the start-stop switch 44 in parallel circuit relationship with the solenoid 42 for controlling and setting the speed of the power unit 120 during the pumping operation and, more particularly, for setting the engine speed to a preselected speed upon the closing of the switch 44 for starting the pumping unit 10. To this end, the solenoid 123 is connected by means of a lead wire 124, which has its opposite ends connected to the solenoids 42 and 123 and is also connected to the switch 44 whereby both solenoids are energized upon closing the switch 44. The other terminals of the solenoids 42 and 123 are each connected to ground as is the remaining terminal of the battery 43. As is conventional, the solenoid 123 is provided with a plunger 123[a] which, in this instance, mounts a bell crank 125. One end of the bell crank 125, the end identified by the reference numeral 125[a], is coupled to the throttle control of the carburetor of the power unit 120 to control the volume of fuel supplied to the power unit and thereby the engine speed. With this arrangement, the energization of the solenoid 123 pulls its plunger into a preselected location and thereby causes the bell crank 125 to pivot in a counter-clockwise fashion to actuate the throttle control. The bell crank 125 is maintained in this position as long as the solenoid 123 is energized. This, then, effectively sets the power unit 120 to a preselected engine speed during the intervals that the solenoid 123 is energized. It will, of course, be appreciated that when the pump 10 is shut off by opening the switch 44 not only is the solenoid 42 de-energized, but the solenoid 123 is de-energized and the bell crank 125 rotates in a clockwise direction to thereby reset the power unit 120 to its idling speed.

The pump 10 of the present invention is further arranged with control means that allows the pump to be remotely turned on and off as well as controlling the engine speed remotely. For this purpose a control cable 126 is connected with the vehicle battery 43 by means of a control conductor 126[a] that is directly connected with the remote start-stop switch 127. The normally open terminal of the switch 127 is connected to a relay coil 128 by means of a control conductor 126[b]. The relay coil 128 has its opposite end connected to ground potential to complete the circuit to the battery 43. The relay coil 128 is provided with a pair of normally open contacts 128[a] and 128[b]. The contact 128[b] is connected to the negative terminal of the battery 43, while the contact 128[a] is connected in common with the normally open contact of the on-off switch 44 to thereby place this pair of contacts in parallel circuit relationship with the switch 44. It should now be appreciated that with the on-off switch 44 in an open position the pump 10 may be turned on and off at a remote location by the operation of the switch 127 which actuates the relay coil 128 and, in turn, closing the contacts 128[a] and 128[b] for supplying current to the solenoids 42 and 123 simultaneously.

In addition to the remote control of the energization of the pump 10, the engine speed may be remotely controlled by means of a control cable 130 having a control knob 131 connected at one end thereof for operating same. The free end of the control cable 130 is connected to the bell crank 125 at the end identified by the reference numeral 125[b], or the end opposite from the end 125[a]. The control cable 130 is of conventional construction and is preferably a flexible cable which is effective to operate the bell crank 125 to rotate it in a counter-clockwise direction upon operation of the control knob 131. It should now be appreciated that the actuation of the control knob 131 functions to change the engine speed from its preselected speed in accordance with the clockwise or counter-clockwise rotation of the bell crank 125 as operated by the cable 130. For the remote control of the engine, it should be appreciated that such a speed control is an important practical aspect since in the conventional internal combustion engines no governors are provided and when the engine load is reduced some control is necessary to prevent the engine from running away. With such a remote control arrangement, the operator of the pump may be located some distance from the pump and, in fact, may be controlling the discharge of the concrete from the conduit 20 as is the operator illustrated in FIG. 1. With this remote control arrangement the amount of concrete delivered at any particular location can be carefully controlled by the operation of the on-off switch 127 and the response of the pump 10 is such that not only large volumes of concrete may be controlled by small volumes down to and including a handful may be discharged by operatig the remote switch 127 on and off. This aleviates the necessity of communication between an operator located at the control panel 13 and an operator at the point of discharge of the concrete.

Now referring to FIGS. 3 through 6, the operation of the fluid pressure circuit controlling the pumping action will be described. The hydraulic circuit is shown in FIG. 3 at its at rest position or off position, no concrete is being pumped. It will also be assumed that the reversing valve 67 is positioned in its normal concrete pumping position. With the hydraulic circuit in the off position, the fluid pressure generator 30 provides fluid pressure at its pump fluid outlet port 34 of 60 pounds per square inch. This fluid or oil is coupled to the volume control valve 48 by means of the line 41 but is not conveyed through the valve 48 due to the valve 48 being in its off position. This fluid is also conveyed to the check valve port of the accumulator 74 but since the accumulator is charged to a higher pressure the accumulator check valve remains closed. The accumulator 74 supplies fluid to the line 75 and, as illustrated, causes the forward end of the cylinder 22[b] to be pressurized. It is assumed that at this time the piston 14[a] is at the end of its return stroke, left-hand end, and, therefore, the port 76 for the associated pilot valve 77 is closed to the port 87 communicating with the fluid motor 22. The port 87 is in communication with the port 85, which is connected directly to the tank 38 by means of the conduit 86. Also it will be assumed that the piston 15[a] is at the end of its pumping stroke to have operated its associated pilot valve 78 to place the ports 79 and 91 in communication. The fluid line 75 is also connected to the fluid line 80 in turn connected to the port 79 for the pilot valve 78. This arrangement for the ports of the pilot valve 78 causes fluid to be transmitted therethrough to the fluid line 71, through the ports of the reversing valve 67 to the fluid line 72 and into the right-hand end of the cylinder 22[b] of the fluid pressure motor 22 to position the piston 22[a] adjacent the left-hand end of the cylinder 22[b] and thereby maintain the control valve element 21 in the illustrated position. If the positions of the pistons 14[a] and 15[a] are reversed, the positions of their pilot valves 77 and 78 will be reversed whereby the fluid motor 22 will have its piston 22[a] positioned at the opposite end of the cylinder 22[b] and the control valve 21 will be in its alternate position from the one illustrated. It should be appreciated that at this off position the fluid pressure generator 30 is not pumping because the orifice sampling line 35 is vented to the tank 38 through the check valve 36. Specifically, the orifice sampling line 35 is vented to the tank since the opposite end of the check valve 36 is connected to the port B of the pilot valve 40 through the port T and the conduit 45 which is directly connected to the tank 38.

It should be noted that an aspect of this control circuit is that at the off position both pistons are depressurized and, therefore, there is no pressure on the concrete in the pump itself. After the pump 10 has been in operation and it has been turned off, the pressure generator 30 is shut off and the circuit becomes depressurized, the oil flowing back into the tank 38. At this time if there is any residual pressure in the conduit 20, it will overcome the hydraulic circuit pressure and push the pumping piston back until this pressure is relieved. The practical advantage of this is that if the pump is shut down for any length of time, the concrete stored in the pump 10 will be at atmospheric pressure and there will be no tendency for the concrete to pack as in prior art concrete pumps.

Figure 4:
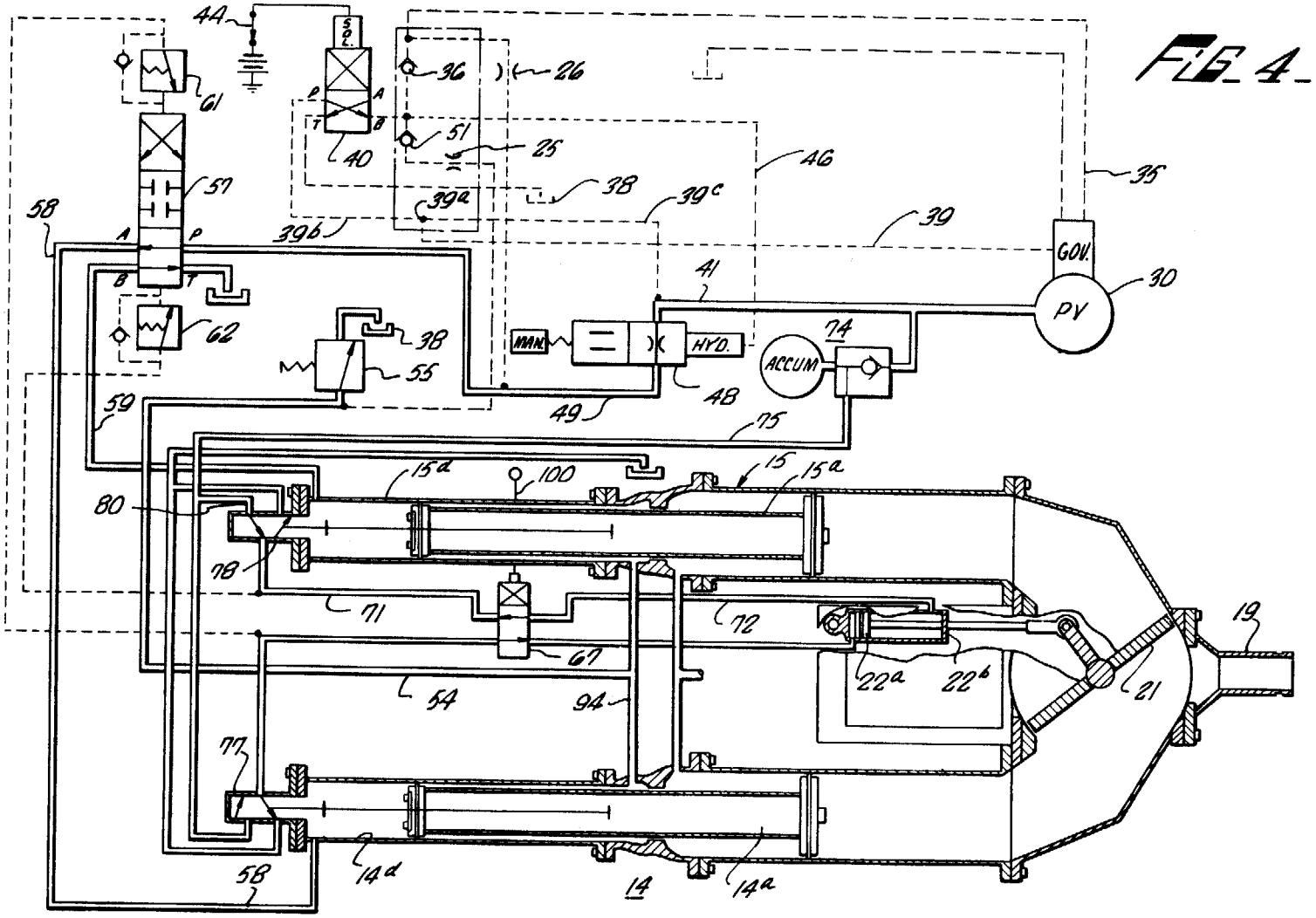

To place the concrete pump 10 in operation, the solenoid 42 associated with the pilot valve 40 is energized by means of the switch 44 on the control panel 13. This phase of the pump operation is illustrated in FIG. 4. The energization of the solenoid 42 is effective to reverse the connections of the pilot lines connected to the pilot valve 40. Specifically, the pressure port P is in communication with the pressure port B while the blocked port A is in communication with the tank port T. With this change in position of the ports for the pilot valve 40, the orifice sampling line 35 is no longer in direct communication with the tank 38. Tracing this fluid path it will be seen that the pressure in the line 41 is transmitted through pilot line 39[c] and 39[b], the ports P and B of pilot valve 40, to line 46 to apply pilot pressure for operating the hydraulic motor controlling the volume control valve 48. At this time this pressure path also maintains the check valve 36 closed thereby disconnecting the orifice sampling line 35 from the tank 38. The operation of the hydraulic motor places the ports of the valve 48 in communication to allow fluid to pass therethrough and by means of the fluid line 49 is coupled to the reversing valve 57. The operation of the hydraulic motor for the volume control valve 48 sets the opening of the valve to a preselected level and may be further adjusted by means of the manual control associated with this volume control valve. The orifice sampling line 35 is pressurized by means of the pilot line 27 connected to the fluid line 49, and the junction 28 on the upstream side of the closed check valve 36. The orifice 26 controls the flow of oil to the orifice sampling port 31 of the pressure generator 30. The orifice 26 is also employed to control the sequence of the oil flow when the pump 10 is shut off. At that time, the oil from the system is choked down by the orifice 26 to allow the oil from the generator 30 to flow to the tank first and then from the system. At this time the check valve 51 passes oil to the line 53 through the orifice 25 to control the small amount of oil supplied to the chambers 14$^f$ and 15$^f$ of the pumping units 14 and 15 respectively. Under these conditions the generator 30 pumps oil to the volume control valve 48. The fluid in the line 49 is conducted to the reversing valve 57 and which valve is still in its at rest position, whereby the fluid is communicated through the ports P and A to the fluid line 58 and then into the cylinder section 14$^d$ for the pumping unit 14 to pressurize the piston 14$^a$ in a pumping direction. The fluid applied to the cylinder section 14$^d$ causes the fluid in chamber 14$^f$ to be conveyed through the line 94 to the chamber 15$^f$ of the cylinder section 15$^c$ to drive it along its return stroke. The fluid is also conveyed by means of the line 54 to the relief valve 55 which is still maintained in its normal closed position and, therefore, is not conveyed to the tank 38. The fluid pressure motor 22 still has fluid pressure applied thereto as in its at rest position and so the position of the control element 21 is not changed.

The travel of the piston 15$^a$ on its return stroke forces the fluid in the cylinder section 15$^d$ to the tank 38 through the conduit 59, the B and T ports of the reversing valve 57 and the conduit 60 directly connected to the tank 38. It will be appreciated that the travel of the piston 15$^a$ on its return stroke will produce a suction to draw concrete from the hopper 16 into the cylinder section 15$^c$. When the piston 15$^a$ reaches the end of its return stroke, the oil that is located to the right of the rear piston head 15$^e$, as illustrated, or in the chamber 15$^f$ is conveyed to the tank 38 by means of the feedback line 94 and the line 54 and through the relief valve 55 which is opened at this time due to the increase in pressure. With the piston 15$^a$ reaching the end of its return stroke it also shifts the position of the pilot valve 78. The shifting of the pilot valve 78 disconnects the ports 79 and 91 and thereby removes pressure from the right-hand end of the piston 22$^a$ of the fluid pressure motor 22. During this time, the piston 14$^a$ is still traveling on its forward stroke and pumping concrete out of the concrete chamber 21$^a$ and through the outlet 19. This action continues until the piston 14$^a$ travels against the stop 89$^a$ and reverses the position of the pilot valve 77 in response thereto. The piston 14$^a$ travels to the end of its pumping stroke and is momentarily at rest along with the piston 15$^a$.

Figure 5:
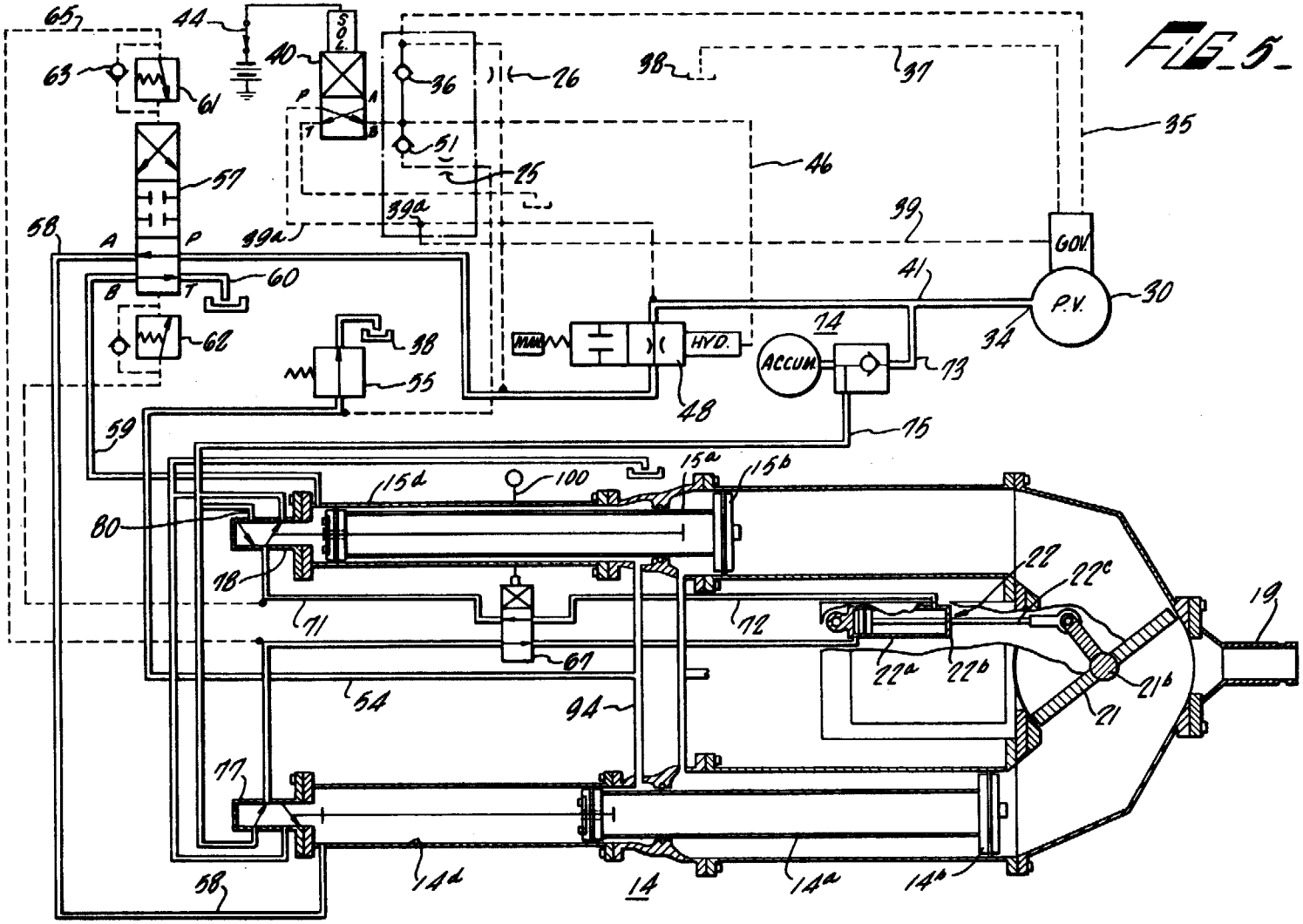

This position of the control circuit with the pistons 14$^a$ and 15$^a$ both at rest and at opposite ends of their strokes is illustrated in FIG. 5. The pilot valve 77 associated with the pumping unit 14 is now positioned whereby the ports 76 and 87 are in communication and, therefore, fluid is passed therethrough to the line 88 through the reversing valve 67 to the cylinder 22$^b$ to the left side of the piston 22$^a$ thereby preparing the motor 22 to switch the control element 21 to its alternate position. This change in position of the pilot valve 77 also disconnects the line 88 from the port 85.

Figure 6:
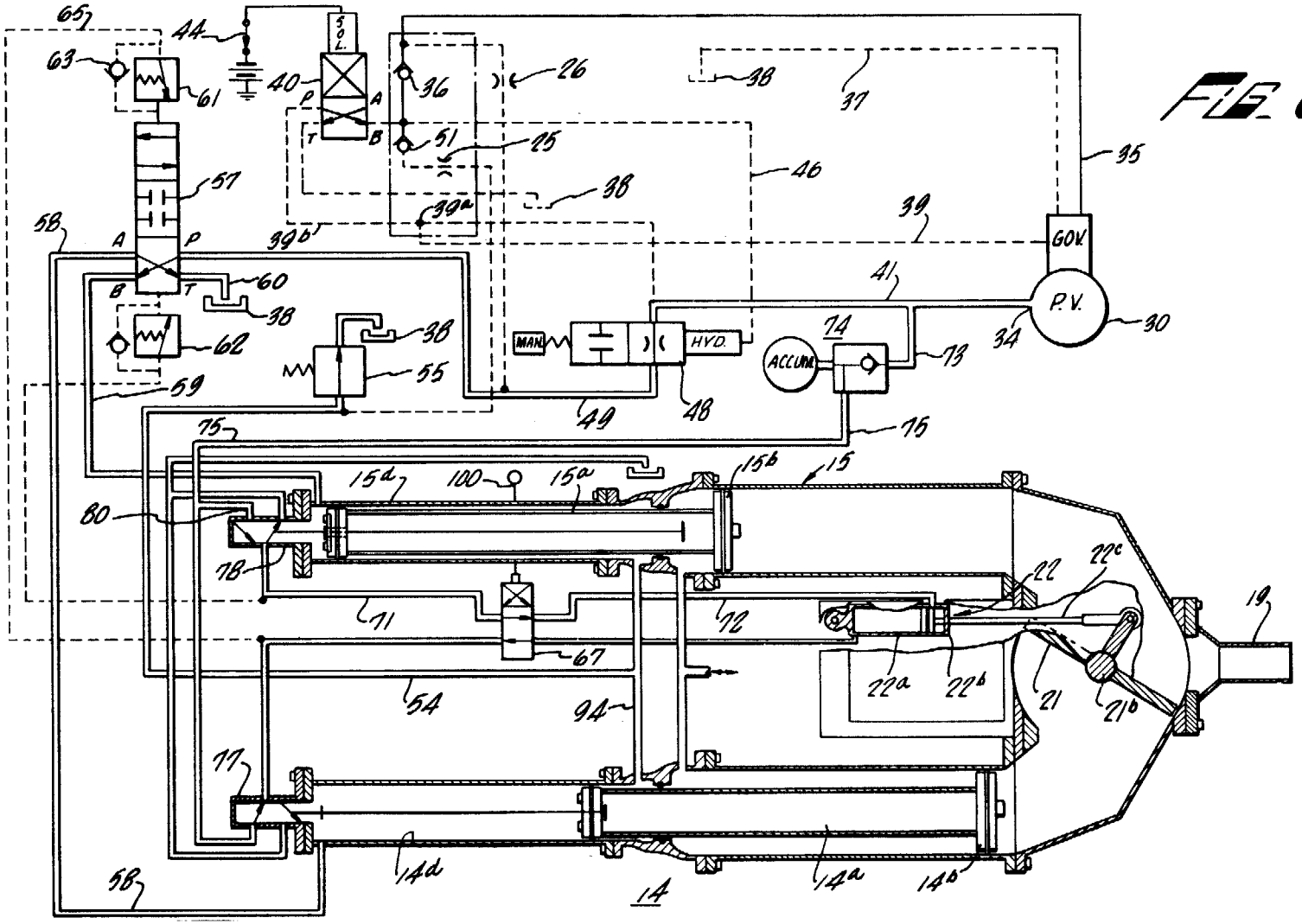

When the motor 22 is pressurized to an extent to allow the piston 22$^a$ to reach its right-hand extremity, the control element 21 is switched to the alternate position illustrated in FIG. 6. With the switch in position of the control element 21, the concrete can then be pumped by the pumping unit 15 through the discharge outlet 19 while the pumping unit 14 may be charged during the return stroke of the piston 14$^a$. It should be noted that during the interval that the unit 22 is being pressurized for switching the position of the control element 21, the four-way control valve 57 is not operated since the sequence valve 61 associated therewith prevents the operation thereof. The sequence valve 61 senses the pressure on the left-hand side of the piston 22$^a$ and sufficient pressure is not generated for operating the sequence valve 61 until the piston 22$^a$ reaches its right-hand extremity. The only other condition that generates sufficient pressure is when the control element 21 engages a large stone or foreign object and then switches the position of the element 21. It will be appreciated at this time the control element 21 is switched and then the sequence valve 61 operates the reversing valve 57 as illustrated in FIG. 6. The operation of the reversing valve 57 now connects the fluid line 49 to the port P and the communication of this port with the port B to the fluid line 59 to pressurize the left-hand end of the piston 15$^a$ to cause it to travel in its pumping stroke to move to the right. The operation of the reversing valve 57 is also effective to connect the ports A and T together and thereby connect the line 58 to the tank 38 allowing the fluid in the cylinder section 14$^d$ to be discharged to the tank 38 with the commencement of the piston 14$^a$ on its return stroke. The piston 14$^a$ is started on its return stroke due to the pressure generated by the piston 15$^a$ on its pumping stroke, forcing the fluid through the line 94 into the chamber 14$^f$ and against the piston head 14$^e$ to thereby cause it to travel in the reverse direction.

With the above operation in mind, it should be noted that the switching of the control element 21 is effected only while both pumping units 14 and 15 have their pistons at rest. The operation of the control element 21 at this interval minimizes the surges in the conduit and renders the concrete pump 10 of this invention more acceptable for use by the operator. If the control element 21 was actuated during the pumping operation, the surges created in the conduit 20 would be of sufficient intensity to knock down the operator or to badly shake him up. The minimization of the surges in the conduit 20 also prevents the loosening of any forms over which the conduit may be passed due to the continuous vibration that may be set up in the conduit due to this pumping action.

With the travel of the piston 14$^a$ on its return stroke and the piston 15$^a$ on its pumping stroke, the action is such that the return stroke of the piston 14$^a$ will be completed prior to the completion of the pumping stroke. The above sequence is repeated upon the completion of the pumping stroke of the piston 15$^a$, the control unit 22 is pressurized once again at its right-hand end to switch the position of the control element 21, and the piston 14$^a$ has fluid applied to its left-hand end to return it to its pumping cycle and the sequencing action repeats itself.

What is claimed is:

1. A portable pump for pumping moist, compressible materials such as plaster, concrete, mortar, and the like including:

a motor vehicle having a power unit for propelling the vehicle, a pump for pumping said materials mounted on said motor vehicle to be movable therewith, said pump including drive means therefor, switchable power take-off means coupled between the vehicle power unit and the pump drive means for alternately coupling the power unit for propelling the vehicle and for powering the drive means, said pump further including pumping means coupled to be actuated by said drive means, means for charging the pumping means with a material to be pumped, a control chamber mounting a single movable control element for controlling the communication of the pumping means with said charging means to allow the pumping means to be alternately charged and discharged therethrough, and control means coupled to said drive means for actuating the pumping means and the control element in a preselected sequence to thereby actuate the pumping element to discharge a charged material when the control element is positioned to allow communication between the pumping unit and the control chamber.

2. In apparatus for pumping moist, compressible materials such as plaster, concrete, mortar, and the like including:

first and second piston-cylinder units reciprocable between a pumping stroke and a return stroke, means for charging the first and second piston-cylinder units with a moist, compressible material to be pumped, means for defining a common material chamber having a material outlet for said piston-cylinder units, a single control member mounted in the material chamber to control the alternate discharge of said material through the outlet by said piston-cylinder units, a pilot valve individual to and constructed integrally with each of said piston-cylinder units, means carried by each of said pistons and connected to the associated pilot valve for operating same in response to the reciprocation of the pistons, and fluid pressure control circuit means connected to said first and second piston-cylinder units and the control member for alternately pressurizing said first and second piston-cylinder units and thereby causing the corresponding pilot valves to alternately operate and switch the position of the control member when the first and second pistons are at opposite ends of their strokes.

3. In a fluid power control circuit having a pair of work piston-cylinder units each having a pressure stroke and a return stroke:

a pair of pilot valves for said pair of work pistons, each work piston carrying a pilot rod coupled to an individual pilot valve for operating same at the ends of the pressure and return strokes, a fluid pressure generator, conduit means interconnecting said work cylinders to cause the fluid pressure applied to one of said work pistons from said generator to cause the piston to travel in a preselected direction to be applied to the other of said work pistons to cause it to travel in a direction opposite to said preselected direction, another work piston-cylinder unit, conduit means interconnecting the opposite sides of said latter piston with one of said pilot valves for alternately applying fluid pressure to the opposite sides of said latter mentioned piston, a reversing valve, conduit means connecting the reversing valve to said generator and to said pair of work piston-cylinder units for alternately applying the fluid pressure of said generator to said pair of work pistons, sequence valve means connected for controlling the reversing valve, and conduit means connected to the sequence valve means and to the opposite ends of said another work cylinder, said sequence valve means being responsive to a preselected fluid pressure created in said another work cylinder for operating said reversing valve.

4. In a fluid power control circuit as defined in claim 3 including means for reversing the operation of said another work piston-cylinder unit.

5. In a fluid power control circuit as defined in claim 4 wherein said reversing means comprises manually operable valve means.

6. Apparatus for pumping moist, compressible materials such as plaster, concrete, mortar, and the like comprising:

first and second piston-cylinder assemblies adapted to allow the pistons to reciprocate between a pumping stroke and a return stroke, means for defining a common material chamber having an outlet directly connected in communication with each of the first and second cylinders, means for receiving and storing a material to be pumped and connected in communication with each of the first and second cylinders, a material control valve swingably mounted in the material chamber for alternately closing off the chamber outlet to one of the piston-cylinder assemblies to thereby define a free flow material path for the other piston-cylinder assembly through the chamber outlet, a source of heat exchange fluid, conduit means connected to said source and to the material receiving portions of each of the cylinder assemblies whereby the fluid in one cylinder is delivered to the other cylinder in response to the piston in said one cylinder traveling on its return stroke, fluid pressure generator means, means for driving said pressure generator, and fluid pressure control circuit means coupled to said generator means and to said first and second piston-cylinder assemblies for alternately pressurizing said pistons on a pumping stroke and for controlling the material control valve to position same to provide the free flow material path for the piston to be pressurized on its pumping stroke.

7. Apparatus for pumping moist, compressible materials such as plaster, concrete, mortar, and the like as defined in claim 6 wherein said fluid pressure generator means includes a fluid pressure generator comprising a variable volume fluid pressure generator and a fluid governor connected thereto for maintaining a constant fluid flow in the control circuit, and said control circuit includes means for manually controlling the volume of fluid flow in said control circuit means.

8. Apparatus for pumping moist, compressible materials such as plaster, concrete, mortar, and the like comprising:

first and second piston-cylinder assemblies adapted to allow the pistons to reciprocate between a pumping stroke and a return stroke, means for defining a common material chamber having an outlet directly connected in communication with each of the first and second cylinders, means for receiving and storing a material to be pumped and connected in communication with each of the first and second cylinders, a material control valve swingably mounted in the material chamber for alternately closing off the chamber outlet to one of the piston-cylinder assemblies to thereby define a free flow material path for the other piston-cylinder assembly through the chamber outlet, a source of heat exchange fluid, conduit means connected to said source and to the material receiving portions of each of the cylinder assemblies whereby the fluid in one cylinder is delivered to the other cylinder in response to the piston in said one cylinder travelling on its return stroke, fluid pressure generator means, means for driving said pressure generator, and fluid pressure control circuit means coupled to said generator means and to said first and second piston-cylinder assemblies for alternately pressurizing said pistons on a pumping stroke and for controlling the material control valve to position same to provide the free flow material path for the piston to be pressurized on its pumping stroke, each of said piston-cylinder assemblies being defined with a fluid chamber connected with said fluid pressure control circuit means to receive fluid therefrom and including a conduit interconnecting said chambers whereby the fluid in one of the chambers is responsive to the pressurization of the corresponding piston to cause the fluid to be conveyed to the other piston for pressurizing the other piston on its return stroke.

9. Apparatus for pumping moist, compressible materials such as plaster, concrete, mortar, and the like comprising:

first and second piston-cylinder assemblies adapted to allow the pistons to reciprocate between a pumping stroke and a return stroke, means for defining a common material chamber having an outlet directly connected in communication with each of the first and second cylinders, means for receiving and storing a material to be pumped and connected in communication with each of the first and second cylinders, a material control valve swingably mounted in the material chamber for alternately closing off the chamber outlet to one of the piston-cylinder assemblies to thereby define a free flow material path for the other piston-cylinder assembly through the chamber outlet, fluid pressure generator means, means for driving said pressure generator, and fluid pressure control circuit means coupled to said generator means and to said first and second piston-cylinder assemblies for alternately pressurizing said pistons on a pumping stroke and maintaining them momentarily at rest and for changing the position of the material control valve when both pistons are at rest to position same to provide the free flow material path for the piston to be pressurized on its pumping stroke, said control circuit comprising a piston-cylinder assembly for controlling the position of the material control valve, means for sensing the pressure on opposite sides of said last mentioned piston-cylinder assembly, a four-way reversing valve connected to said generator means and to said sensing means for operating same when the pressure in said last mentioned cylinder is at a preselected level during an interval both pistons are momentarily at rest to connect the first and second piston-cylinder assemblies to the generator means for reversing the position of the first and second pistons.

10. Apparatus for pumping moist, compressible materials such as plaster, concrete, mortar, and the like as defined in claim 9 wherein said control circuit means includes a manually operated reversing valve connected in circuit with the material control valve piston-cylinder for selectively reversing the action thereof and thereby the pumping action.

11. In apparatus for pumping moist, compressible materials such as plaster, concrete, mortar, and the like, including: first and second pumping units, means for charging the first and second pumping units with said materials, a common discharge passage for said pumping units, hydraulic drive means for alternately operating said first and second pumping units in a timed relationship whereby both units are momentarily at rest, a discharge control member mounted in the discharge passage to control the alternate charging and discharging of said materials through the passage by said pumping units, a discharge conduit connected to said discharge passage, hydraulic control means connected to said control member for changing the discharge position of said control member during the interval the pumping units are at rest, and manual means for reversing the pumping action of said pumping units to cause the pumped material to be pumped back through the discharge conduit and into the charging means.

12. In apparatus for pumping moist, compressible materials such as plaster, concrete, mortar, and the like, including: first and second pumping units, means for charging the first and second pumping units with said materials, a common discharge passage for said pumping units, hydraulic drive means for alternately operating said first and second pumping units in a timed relationship whereby both units are momentarily at rest, a discharge control member mounted in the discharge passage to control the alternate charging and discharging of said materials through the passage by said pumping units, a discharge conduit connected to said discharge passage, hydraulic control means connected to said control member for changing the discharge position of said control member during the interval the pumping units are at rest, manual means for reversing the pumping action of said pumping units to cause the pumped material to be pumped back through the discharge conduit and into the charging means, and a motor vehicle mounting said pumping apparatus to be movable therewith, said drive means being adapted to be powered from the power unit of the motor vehicle.

13. In apparatus for pumping moist, compressible materials such as plaster, concrete, mortar, and the like, including: first and second pumping units, means for charging the first and second pumping units with said materials, a common charging and discharging passage for said pumping units, hydraulic drive means for alternately operating said first and second pumping units in a timed relationship whereby both units are momentarily at rest, a rotatable discharge control member mounted in the discharge passage to control the substantially simultaneous charging and discharging of said materials into and out of the passage by allowing alternate charging and discharging of said materials through the passage by said pumping units, hydraulic control means connected to said control member for rotating said control member during the interval the pumping units are momentarily at rest, and means for reversing the pumping action of said pumping units to cause the pumped material to be pumped back into the charging means.

14. In apparatus for pumping moist, compressible materials such as plaster, concrete, mortar, and the like including: first and second pumping units, means for charging the first and second pumping units with said materials, an enclosed material chamber having a material outlet in communication with said pumping units and said charging means, a plate-like control member swingably mounted in the chamber to sub-divide the chamber for alternately allowing the sub-divided portions to function with said pumping units as a means to charge the material therein and to discharge the material therefrom, the control member being constructed, defined and arranged relative to the chamber to isolate the portion of the chamber discharging material from communication with the charging means but in communication with said chamber material outlet and to maintain the other portion in communication with the charging means while isolating it from said chamber material outlet, and automatic means for operating said pumping units and for changing the position of said control member in a preselected timed relationship.

15. In apparatus as defined in claim 14 including liquid means for simultaneously cooling and lubricating the pumping units.

16. In apparatus as defined in claim 14 wherein the pumping units are piston-cylinder units and a liquid is stored in at least a portion of the cylinders that the associated work piston head travels in for simultaneously cooling and lubricating the piston head and thereby the material being operated on.

17. In apparatus as defined in claim 16 wherein the liquid is water or the like.

18. In apparatus as defined in claim 14 wherein said operating means is controllable and includes means for remotely controlling said operating means.

19. In apparatus as defined in claim 14 including means for reversing the operation of the control member to thereby reverse the pumping action on the material.

20. In apparatus as defined in claim 19 wherein said means is manually controllable.

21. In apparatus as defined in claim 14 wherein said operating means includes automatic control means for operating said pumping units in a timed relationship whereby both units are momentarily at rest and to rotate the control member during the interval the pumping units are at rest.

22. In apparatus as defined in claim 21 wherein said operating means is hydraulic operating means.

23. In apparatus for pumping moist, compressible materials such as plaster, concrete, mortar, and the like comprising: first and second pumping units, means for charging the first and second pumping units with said materials, a totally enclosed material chamber having a material outlet arranged in alignment with each of the pumping units and the charging means and constructed and defined to allow the material to flow freely to and from the chamber, the pumping units and the charging means, a solid control member rotatably mounted in the chamber to divide the chamber in a fashion for alternately allowing the portions on the opposite sides of the control member to function for charging and discharging material therethrough substantially simultaneously in accordance with the position thereof, liquid storage means mounted in communication with each of said pumping units for cooling and lubricating each of the pumping units, and hydraulic means for operating said pumping units in a preselected timed relationship whereby each of the pumping units are momentarily at rest and for operating said control member during the interval said pumping units are both at rest.

24. In apparatus of the type defined in claim 23 including manual means for reversing the pumping action to cause material to be pumped back into the charging means.

25. In apparatus of the type defined in claim 24 including means for remotely controlling the operation and speed of the pump.

26. A fluid power control circuit comprising a pair of work piston-cylinder units each including a reciprocating piston having a pressure stroke and a return stroke, means for maintaining a constant fluid flow, another work piston-cylinder unit, conduit means interconnecting said work cylinders and said means to cause the fluid applied to one of said pair of work pistons from said fluid means to cause the piston to travel in a preselected direction to be applied to the other of said pair of work pistons to cause it to travel in a direction opposite to said preselected direction, valve means for controlling the flow of fluid to the opposite sides of said another piston and adapted to be operated in response to the completion of the strokes of said piston-cylinder units, conduit means interconnecting the opposite sides of said another piston with said valve means for alternately applying fluid to the opposite sides of said latter piston in response to the completion of the strokes of both of said first mentioned piston-cylinders and thereby operate the latter mentioned piston-cylinder unit when said other pistons are momentarily at rest, reversing valve means, sequencing valve means connected for controlling the reversing valve means, and conduit means for connecting the sequence valve means to said another work cylinder.

27. A fluid power control circuit comprising a pair of fluid pressure responsive pumping units, means for applying fluid under pressure to said units for alternately operating them in a pumping stroke and a return stroke, another pumping unit normally arranged to be in a non-working condition during the operation of the pair of pumping units, valve means including reversing valve means connected to said pumping units for alternately applying fluid thereto for causing them to be alternately in a pumping and return stroke and to reverse their strokes after a preselected interval they are both at rest and to operate said another pumping unit during said preselected interval, and sequencing valve means operable in response to the operation of said another pumping unit for actuating said reversing valve means to effect said sequencing.

28. A fluid power control circuit as defined in claim 27 including manual means for reversing the operation of said another pumping unit.

*29. An apparatus for pumping moist, compressible materials such as plaster, concrete, mortar and the like including*

*a substantially rectangular, enclosed material chamber for receiving the materials to be pumped and to be pumped therethrough, said chamber having a single material inlet for conveying the material to be pumped into the chamber and a single material outlet for conveying the pumped material out of the chamber,*

*a plate-like control member swingably mounted in the chamber between two positions to subdivide the chamber so as to isolate the single inlet from the single outlet,*

*means for storing the material to be pumped connected with the chamber material inlet to allow the material to be drawn into the chamber in response to pumping action,*

*first and second pumping units arranged on opposite sides of the material chamber,*

*individual conduit means for the pumping units for conveying the material to be pumped connected between a pumping unit and the material chamber on opposite sides of the material inlet whereby the action of the control member in one position provides a material flow path through the material inlet to one of the pumping units while being isolated from the material outlet while simultaneously providing a material flow path through the material chamber on the opposite side of the control member from the other pumping unit to the material outlet while being isolated from the material inlet, and the movement of the control element to the second position isolates said one pumping unit from the material inlet and places it in communication with the material outlet while said other pumping unit is in communication with the material inlet and isolated from the material outlet, each of the conduit means allowing access to the interior of the material chamber,*

*and automatic means for operating said pumping units and for changing the position of said control member to swing the control element between its two positions in a preselected timed relationship to the pumping strokes of the pumping units, said pumping units being controlled to be alternately in pumping strokes.*

*30. An apparatus for pumping moist, compressible materials such as plaster, concrete, mortar and the like as defined in claim 29 wherein the automatic means includes a bidirectional piston-cylinder unit for operating the control element between its two positions.*

*31. An apparatus for pumping moist, compressible materials such as plaster, concrete, mortar and the like as defined in claim 30 wherein said control member is vertically mounted.*

*32. An apparatus for pumping moist, compressible materials such as plaster, concrete, mortar and the like as defined in claim 29 wherein said material inlets and outlets are constructed and defined on opposite walls of the material chamber.*

*33. An apparatus for pumping moist, compressible materials such as plaster, concrete, mortar and the like including*

*a substantially rectangular, enclosed material chamber for receiving the materials to be pumped and to be pumped therethrough, said chamber having a single material inlet for conveying the material to be pumped into the chamber and a single material outlet for conveying the pumped material out of the chamber,*

*a plate-like control member swingably mounted in the chamber between two positions to subdivide the chamber so as to isolate the single inlet from the single outlet,*

*means for storing the material to be pumped connected*

*with the chamber material inlet to allow the material to be drawn into the chamber in response to pumping action*

*first and second pumping units arranged on opposite sides of the material chamber,*

*conduit means for the pumping units for conveying the material to be pumped connected between a pumping unit and the material chamber on opposite sides of the material inlet whereby the action of the control member in one position provides a material flow path through the material inlet to one of the pumping units while being isolated from the material outlet while simultaneously providing a material flow path through the material chamber on the opposite side of the control member from the other pumping unit to the material outlet while being isolated from the material inlet, and the movement of the control element to the second position isolates said one pumping unit from the material inlet and places it in communication with the material outlet while said other pumping unit is in communication with the material inlet and isolated from the material outlet, said conduit means allowing access to the interior of the material chamber,*

*and automatic means for operating said pumping units and for changing the position of said control member to swing the control element between its two positions in a preselected timed relationship to the pumping strokes of the pumping units, said pumping units being controlled to be alternately in pumping strokes.*

*34. An apparatus for pumping moist, compressible materials such as plaster, concrete, mortar and the like as defined in claim 33 wherein the automatic means includes a bidirectional piston-cylinder unit for operating the control element between its two positions.*

*35. An apparatus for pumping moist, compressible materials such as plaster, concrete, mortar and the like including*

*a substantially rectangular, enclosed material chamber for receiving the materials to be pumped and to be pumped therethrough, said chamber having a single material inlet for conveying the material to be pumped into the chamber and a single material outlet for conveying the pumped material out of the chamber,*

*a plate-like control member swingably mounted in the chamber between two positions to subdivide the chamber so as to isolate the single inlet from the single outlet,*

*means for storing the material to be pumped connected with the chamber material inlet to allow the material to be drawn into the chamber in response to pumping action,*

*first and second pumping units arranged on opposite sides of the material chamber,*

*conduit means for the pumping units for conveying the material to be pumped connected between a pumping unit and the material chamber on opposite sides of the material inlet whereby the action of the control member in one position provides a material flow path through the material inlet to one of the pumping units while being isolated from the material outlet while simultaneously providing a material flow path through the material chamber on the opposite side of the control member from the other pumping unit to the material outlet while being isolated from the material inlet, and the movement of the control element to the second position isolates said one pumping unit from the material inlet and places it in communication with the material outlet while said other pumping unit is in communication with the material inlet and isolated from the material outlet,*

*and automatic means for operating said pumping units and for changing the position of said control member to swing the control element between its two positions in a preselected timed relationship to the pumping strokes of the pumping units, said pumping units being controlled to be alternately in pumping strokes.*

*36. An apparatus for pumping moist, compressible materials such as plaster, concrete, mortar and the like as defined in claim 33 wherein said control member is vertically mounted.*

*37. An apparatus for pumping moist, compressible materials such as plaster, concrete, mortar and the like as defined in claim 36 wherein said material inlets and outlets are constructed and defined on opposite walls of the material chamber.*

References Cited

The following references, cited by the Examiner, are of record in the patented file of this patent or the original patent.

UNITED STATES PATENTS

| | | |
|---|---|---|
| 706,979 | 8/1902 | Martin. |
| 2,366,417 | 1/1945 | MacMillan. |
| 2,462,588 | 2/1949 | Wondra. |
| 2,620,965 | 12/1952 | Miller. |
| 2,690,715 | 10/1954 | Pope. |
| 2,998,781 | 9/1961 | Triebel. |
| 3,068,806 | 12/1962 | Sherrod. |
| 3,128,711 | 4/1964 | Voigh et al. |
| 3,146,721 | 9/1964 | Schwing. |
| 3,181,469 | 5/1965 | Schumann. |

ROBERT M. WALKER, Primary Examiner

U.S. Cl. X.R.

103—227